US008244761B1

(12) United States Patent
Dickens et al.

(10) Patent No.: US 8,244,761 B1
(45) Date of Patent: Aug. 14, 2012

(54) SYSTEMS AND METHODS FOR RESTRICTING ACCESS TO INTERNAL DATA OF AN ORGANIZATION BY EXTERNAL ENTITY

(75) Inventors: Charles Julian Dickens, San Antonio, TX (US); Francisco Jimenez Lugo, Devine, TX (US); Donna Marie Antopia, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 922 days.

(21) Appl. No.: 11/874,329

(22) Filed: Oct. 18, 2007

(51) Int. Cl.
*G06F 17/30* (2006.01)

(52) U.S. Cl. .................. 707/784; 705/4; 705/51; 726/3; 726/27

(58) Field of Classification Search .................. None
See application file for complete search history.

(56) References Cited

U.S. PATENT DOCUMENTS

| 6,941,313 | B2 | 9/2005 | Seliger et al. |
| 6,947,959 | B1* | 9/2005 | Gill .............................. 715/202 |
| 7,185,192 | B1 | 2/2007 | Kahn |
| 2002/0062449 | A1 | 5/2002 | Perna et al. |
| 2002/0065780 | A1* | 5/2002 | Barritz et al. ................... 705/59 |
| 2002/0138572 | A1 | 9/2002 | Delany et al. |
| 2002/0147801 | A1 | 10/2002 | Gullotta et al. |
| 2003/0204469 | A1 | 10/2003 | Combs |
| 2004/0039594 | A1 | 2/2004 | Narasimhan et al. |
| 2004/0044696 | A1 | 3/2004 | Frost |
| 2004/0181679 | A1 | 9/2004 | Dettinger et al. |
| 2004/0187029 | A1 | 9/2004 | Ting |
| 2004/0193456 | A1* | 9/2004 | Kellington ........................ 705/4 |
| 2004/0243835 | A1 | 12/2004 | Terzis et al. |
| 2005/0027552 | A1 | 2/2005 | Massanelli et al. |
| 2005/0097199 | A1 | 5/2005 | Woodard et al. |
| 2005/0137735 | A1 | 6/2005 | Loy et al. |
| 2006/0053168 | A1* | 3/2006 | McDougall et al. ....... 707/104.1 |
| 2006/0253289 | A1 | 11/2006 | Kymal et al. |
| 2007/0180490 | A1* | 8/2007 | Renzi et al. ........................ 726/1 |
| 2008/0098453 | A1* | 4/2008 | Hinton et al. ..................... 726/1 |
| 2008/0172737 | A1 | 7/2008 | Shen et al. |
| 2008/0183519 | A1 | 7/2008 | King et al. |

(Continued)

OTHER PUBLICATIONS

United States Department of Justice; "Select Application Controls Review of the Federal Bureau Prisons's Sentry Database System"; Office of the Inspector General; Report No. 03-25; Jul. 2003; pp. 1-7; http://www.usdoj.gov/oig/reports/BOP/a0325/findings.htm.

(Continued)

*Primary Examiner* — Tony Mahmoudi
*Assistant Examiner* — Michele Choi
(74) *Attorney, Agent, or Firm* — Brooks, Cameron & Huebsch, PLLC

(57) ABSTRACT

A user interface receives a request from an external entity to display a particular subset of internal data of an organization relating to a particular member thereof, determines from a located file corresponding to the external entity that a member ID of the particular member is listed therein, and thereafter retrieves the internal data of the member from a database. The user interface then culls the particular subset of the internal data to be displayed from the retrieved internal data, applies located rules corresponding to the external entity to the display of such particular subset of the internal data to result in any modifications necessary in view of such located rules, and displays such particular subset of the internal data as modified to the external entity.

21 Claims, 4 Drawing Sheets

U.S. PATENT DOCUMENTS

2008/0229112 A1    9/2008    Yamauchi et al.

OTHER PUBLICATIONS

Quality Corporation; "QAW Helps Restrict Access to Personal Data That is Controlled by a Local Government and Its E-Municipality"; downloaded on Oct. 2007; http://www.quality.co.jp/e/solution/LG/secu_02.html; Copyrigh 2007 Quality Corporation, Tokyo Japan.

Ashley, Mitchell; "VISA PCI Best Practices for All Organizations"; Sarbanes-Oxley Compliance Journal; Oct. 7, 2005; pp. 1-6.

Enright, Keith P.; "Privacy Audit Checklist"; downloaded Oct. 2007; http://cyber.law.harvard.edu/ecommerce/privacyaudit.html; Lucira Technologies, Inc., Boston, Massachusetts.

Kalam, et al. "Organization based access control," POLICY'03, IEEE, 2003, 11 pages.

* cited by examiner

SYSTEMS AND METHODS FOR RESTRICTING ACCESS TO INTERNAL DATA OF AN ORGANIZATION BY EXTERNAL ENTITY

CROSS-REFERENCE TO RELATED APPLICATION(S)

The present application is filed concurrently with and shares a common title and disclosure with the following applications, each of which is hereby incorporated herein by the reference in its entirety:
- U.S. patent application Ser. No. 11/874,332, filed Oct. 18, 2007;
- U.S. patent application Ser. No. 11/874,341, filed Oct. 18, 2007;
- U.S. patent application Ser. No. 11/874,346, filed Oct. 18, 2007; and
- U.S. patent application Ser. No. 11/874,350, filed Oct. 18, 2007.

FIELD

The present disclosure is directed to systems and methods that may be implemented to restrict access to internal data of an organization, such as for example customer or member information, by an external entity that is being given limited access to such internal data, such as for example an auditor auditing the data. More particularly, the present disclosure is directed to such systems and methods that allow the external entity/auditor (hereinafter 'auditor') to have access to the internal data necessary for the legitimate purposes of the auditor, while at the same time restricting access to all other internal data.

BACKGROUND

It is generally known that in connection with the operation of an organization, the organization may and generally does compile internal data regarding the operation of such organization and the like. Notably, if the organization has customers, members, or the like (hereinafter 'members'), such internal data may relate to such members, and may in fact include information that may be considered personal or confidential with regard to the organization, each member, or both. For example, the data may include the identity of each member, non-public personal information for each member, financial information regarding each member, a user name and password for each member, product ownership information regarding each member, insurance data regarding each member, and the like. Moreover, the data may include with regard to the organization estimated claims and expenses associated with each member, an internal classification of each member, whether the member is in good standing, data sharing preferences for each member, whether the member is considered an especial risk, and the like. Regardless of the type of internal data, though, it is often if not always the case that the organization wishes to ensure the privacy of non-public information as well as maintain the internal data as being confidential, proprietary, and not for public disclosure.

Nevertheless, there may in fact be times when the internal data of an organization is shared with an external entity. In particular, the organization may be subject to external oversight that from time to time requires access to portions of such internal data. For example, if the organization is a financial brokerage that is a member of an exchange, the exchange may from time to time require an audit of relevant portions of the internal data of the financial brokerage to ensure compliance with rules established by the exchange. Also, if the organization is a bank or the like, the bank may from time to time be required to submit to an audit by the chartering entity that chartered the bank as well as by other regulatory entities. Similarly, if the organization is a contractor performing contract work for a client, the client may also from time to time require an audit of relevant portions of the internal data of the contractor to ensure compliance with terms established for the contract work. Likewise, if the organization is involved in a lawsuit as overseen by a court system, the court system may as part of a discovery process thereof or the like allow a review of relevant portions of the internal data of the organization by an opposing party or an agent thereof. As one last example, if the organization is an insurance company that is regulated by a governmental entity, the governmental entity may from time to time require an audit of relevant portions of the internal data of the insurance company to ensure compliance with insurance laws and/or regulations relating to the governmental entity.

In any case, when an organization allows any external entity to review, audit, or otherwise access (hereinafter, 'audit') some portion of the internal data of an organization, the organization exposes itself to the danger that the external entity may be able to access other internal data of the organization that is not relevant to the audit. Such a danger is compounded if the external entity can not only access such non-relevant internal data but copy and externally distribute same.

Accordingly, a need exists for systems and methods for defining the internal data of an organization that may be accessed by an external auditor auditing the organization, and for restricting access by such an external auditor to such defined internal data and no other internal data of the organization. Moreover, a need exists for such systems and methods that prevents the identified auditor from viewing or otherwise accessing any other internal data of the organization, and that prevents the identified auditor from accessing any systems of the organization not deemed necessary to access the defined internal data of the organization.

SUMMARY

The aforementioned needs are satisfied at least in part by systems and methods with regard to internal data of an organization having members. The internal data is organized according to each member of the organization, resides in an electronic database of the organization, and is accessible from the database by way of a user interface. The organization is subject to external review of the internal data thereof by an external entity which is provided with access to a defined portion of the internal data in the database of such organization by way of the user interface. Access by the external entity is restricted to only the defined portion of the internal data of the organization.

A definition file is produced to include therein an identification (ID) of the external entity that is to perform the external review, a time period during which the external review is to be conducted, and a defined portion of the internal data in the database that the external entity is to be able to access by way of the user interface. The user interface allows the external entity to log thereinto by supplying the ID of such external entity, and refers the supplied ID to an access system that determines based on the referred ID that the external entity is in fact an external entity and is therefore to be provided restricted access to the database based on such external entity status.

Either (a) the access system locates the produced file based on the referred ID and a current time and supplies the located file to the user interface, or (b) the access system prompts the user interface to locate the produced file based on the referred ID and the current time. Similar, either (a) the access system locates access rules for the external entity based on the referred ID and supplies the located rules to the user interface, or (b) the access system prompts the user interface to locate the access rules based on the referred ID. The user interface thus allows the external entity to access only the defined portion of the internal data in the database as set forth in the produced file, and only in accordance with the located rules.

BRIEF DESCRIPTION OF THE DRAWINGS

The foregoing summary, as well as the following detailed description of various embodiments of the present invention, will be better understood when read in conjunction with the appended drawings. For the purpose of illustrating the embodiments, there are shown in the drawings embodiments which may be presently preferred. As should be understood, however, the embodiments of the present invention are not limited to the precise arrangements and instrumentalities shown. In the drawings.

DETAILED DESCRIPTION

Example Computing Environment

Figure 1:
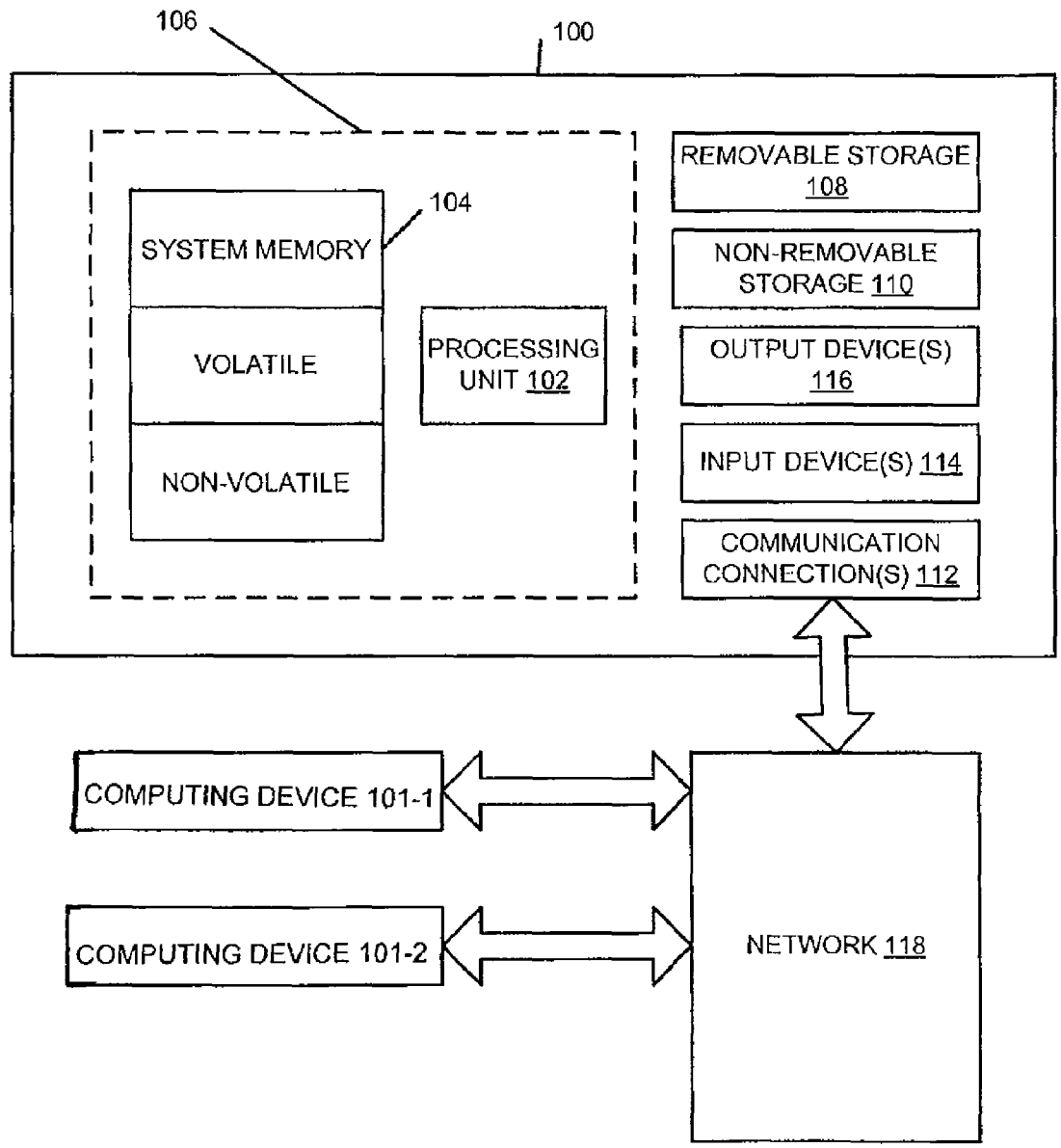
FIG. 1 is a block diagram of an example of a computing environment within which various embodiments of the present invention may be implemented.

FIG. 1 is set forth herein as an exemplary computing environment in which various embodiments of the present invention may be implemented. The computing system environment is only one example of a suitable computing environment and is not intended to suggest any limitation as to the scope of use or functionality. Numerous other general purpose or special purpose computing system environments or configurations may be used. Examples of well known computing systems, environments, and/or configurations that may be suitable for use include, but are not limited to, personal computers (PCs), server computers, handheld or laptop devices, multi-processor systems, microprocessor-based systems, network PCs, minicomputers, mainframe computers, embedded systems, distributed computing environments that include any of the above systems or devices, and the like.

Computer-executable instructions such as program modules executed by a computer may be used. Generally, program modules include routines, programs, objects, components, data structures, etc. that perform particular tasks or implement particular abstract data types. Distributed computing environments may be used where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing aspects described herein includes a computing device, such as computing device 100. In its most basic configuration, computing device 100 typically includes at least one processing unit 102 and memory 104. Depending on the exact configuration and type of computing device, memory 104 may be volatile (such as random access memory (RAM)), non-volatile (such as read-only memory (ROM), flash memory, etc.), or some combination of the two. This most basic configuration is illustrated in FIG. 1 by dashed line 106. Computing device 100 may have additional features/functionality. For example, computing device 100 may include additional storage (removable and/or non-removable) including, but not limited to, magnetic or optical disks or tape. Such additional storage is illustrated in FIG. 6 by removable storage 108 and non-removable storage 110.

Computing device 100 typically includes or is provided with a variety of computer-readable media. Computer readable media can be any available media that can be accessed by computing device 100 and includes both volatile and non-volatile media, removable and non-removable media. By way of example, and not limitation, computer readable media may comprise computer storage media and communication media.

Computer storage media includes volatile and non-volatile, removable and non-removable media implemented in any method or technology for storage of information such as computer readable instructions, data structures, program modules or other data. Memory 104, removable storage 108, and non-removable storage 110 are all examples of computer storage media. Computer storage media includes, but is not limited to, RAM, ROM, electrically erasable programmable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 100. Any such computer storage media may be part of computing device 100.

Computing device 100 may also contain communications connection(s) 112 that allow the device to communicate with other devices. Each such communications connection 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency (RF), infrared and other wireless media. The term computer readable media as used herein includes both storage media and communication media.

Computing device 100 may also have input device(s) 114 such as keyboard, mouse, pen, voice input device, touch input device, etc. Output device(s) 116 such as a display, speakers, printer, etc. may also be included. All these devices are generally known to the relevant public and therefore need not be discussed in any detail herein except as provided.

Notably, computing device 100 may be one of a plurality of computing devices 100, 101-1, 101-2 inter-connected by a network 118, as is shown in FIG. 1. As may be appreciated, the network 118 may be any appropriate network, each computing device 100, 101-1, 101-2 may be connected thereto by way of a connection 112 in any appropriate manner, and each computing device 100, 101-1, 101-2 may communicate with each other in the network 118 in any appropriate manner. For example, the network 118 may be a wired or wireless network within an organization or home or the like, and may include a direct or indirect coupling to an external network such as the Internet of the like.

It should be understood that the various techniques described herein may be implemented in connection with hardware or software or, where appropriate, with a combination of both. Thus, the methods and apparatus of the presently disclosed subject matter, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the presently disclosed subject matter. In the case of program code execution on programmable computers, the computing device generally includes a processor, a storage medium readable by the processor (including volatile and non-volatile memory and/or storage elements), at least one input device, and at least one output device. One or more programs may implement or utilize the processes described in connection with the presently disclosed subject matter, e.g., through the use of an application-program interface (API), reusable controls, or the like. Such programs may be implemented in a high level procedural or object oriented programming language to communicate with a computer system. However, the program(s) can be implemented in assembly or machine language, if desired. In any case, the language may be a compiled or interpreted language, and combined with hardware implementations.

Although exemplary embodiments may refer to utilizing aspects of the presently disclosed subject matter in the context of one or more stand-alone computer systems, the subject matter is not so limited, but rather may be implemented in connection with any computing environment, such as a network 118 or a distributed computing environment. Still further, aspects of the presently disclosed subject matter may be implemented in or across a plurality of processing chips or devices, and storage may similarly be effected across a plurality of devices in a network 118. Such devices might include personal computers, network servers, and handheld devices, for example.

Internal Data of an Organization

Figure 2:
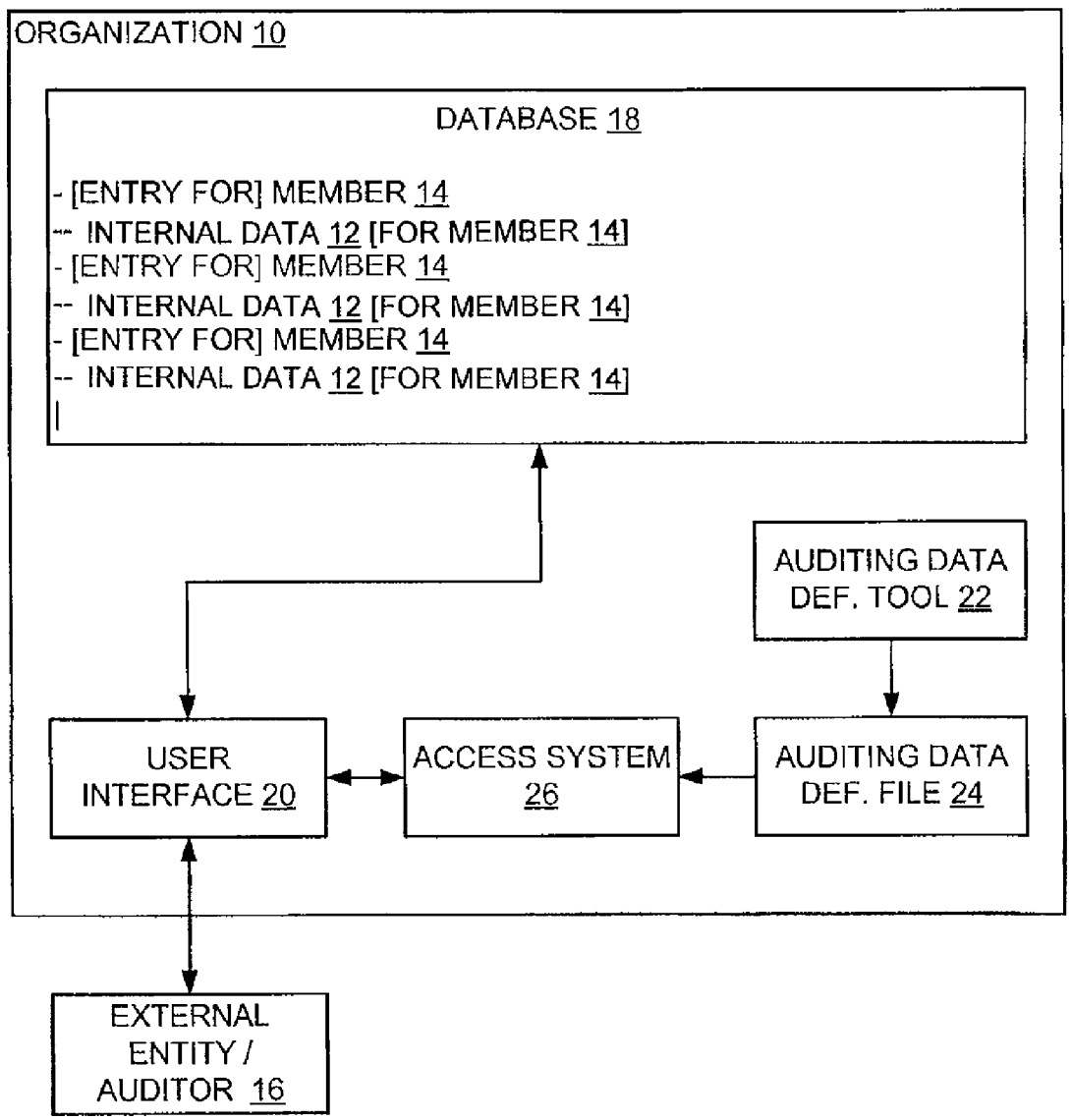
FIG. 2 is a block diagram showing an external entity such as an auditor accessing internal data of an organization by way of a user interface that restricts such access based on a produced definition file, in accordance with various embodiments of the present invention.

Turning now to FIG. 2, it is to be appreciated that in various embodiments of the present invention, an organization 10 has compiled internal data 12 regarding the operation of such organization 10 and the like. Notably, such internal data 12 is likely considered to be personal or confidential with regard to the organization 10, and thus the organization likely has taken measures to ensure that the internal data 12 is not widely or publicly disclosed. As may be appreciated, such internal data 12 may be any appropriate data without departing from the spirit and scope of the present invention. For example, and as was set forth above, if the organization has customers, members, or the like (hereinafter 'members 14'), such internal data 12 may relate to such members 14 and may be organized according to each member 14, and may in fact include information that may be considered personal, private, proprietary, or confidential with regard to the organization 10, each member 14, or both. For example, the internal data 12 may include the identity of each member 14, financial information regarding each member 14, insurance information regarding each member 14, asset information regarding each member 14, a user name and password for each member 14, product ownership information regarding each member 14, and the like. Moreover, the internal data may include with regard to the organization 10 estimated claims and expenses associated with from each member 14, an internal classification of each member 14, whether the member 14 is in good standing, data sharing preferences of the member 14, whether the member 14 is considered an especial risk, and the like.

Nevertheless, and as was pointed out above, such internal data 12 of an organization 10 may at times be shared with an external entity 16. In particular, the organization 10 may be subject to external oversight or auditing (hereinafter, 'auditing') that by its nature requires access to a defined portion of such internal data 12. Examples of such auditing have already been set forth above, and need not be repeated here except to state that such auditing is generally in the nature of a contractual or legal requirement that the organization 10 is subject to whereby the organization 10 is expected to allow the external entity 16 or an auditor thereof (hereinafter, 'auditor 16') access to the defined portion of the internal data 12 of such organization 10.

Note here, that the defined portion of the internal data 12 may be any appropriate defined portion of internal data 12 of the organization 10 without departing from the spirit and scope of the present invention. For example, if the organization 10 is a financial brokerage that is a member of an exchange, the defined portion of internal data 12 may be specific financial transactions, may be all transactions of a specific member 14, may be all transactions that occurred during a specific time period, and the like. Similarly, if the organization 10 is a contractor performing contract work for a client, the defined portion of internal data 12 may be specific policies, underwriting decisions, firm offers, and the like. Likewise, if the organization 10 is involved in a lawsuit as overseen by a court system, the defined portion of internal data 12 may be specific records relating to an event, specific claims, records for a specific member 14 of the organization 10, and the like. As one last example, if the organization 10 is an insurance company that is regulated by a governmental entity, the defined portion of internal data 12 may include specific transactions, all transactions in a specific time period, records for specific members 14 of the organization, and the like.

Especially with regard to an insurance company as the organization 10 at issue, it is to be appreciated that such insurance company may be subject to audit by a veritable plethora of governmental entities. For example, in the United States of America, a national insurance company is likely subject to oversight by one or more insurance departments of the government of every State plus the District of Columbia and U.S. Territories, as well as one or more regulatory agencies of the United States government itself, among others. Moreover, each overseeing governmental branch may require audits in multiple lines of business of the insurance company (auto, life, property, etc.), and each such line of business may be audited by one or more auditors 16 of each overseeing branch multiple times in a calendar year. Thus, the number of auditors 16 being provided access to some defined portion of the internal data 12 of an organization 10 may grow to be a significant number over the course of a year.

Typically, and as may be appreciated, an auditor 16 reviews accounts for each of several members 14 of an organization 10 such as an insurance company to ensure that matters relating to the member 14 have been handled correctly by the organization 10. That is to say, and by way of example, the auditor 16 may review an insurance claim of a member 14 to satisfy itself that the claim was handled in a manner that fully addressed the rights of the member 14 and that the matter was settled in accordance with applicable regulations, or may review the non-renewal of an insurance policy of a member to satisfy itself that the non-renewal was performed in accordance with applicable insurance laws and/or regulations.

Notably, the subject of an audit by an insurance auditor 16 in particular may be a random sampling of members 14 of an insurance company 10, may be a targeted set of such members 14, may be a comprehensive set of all members 14, or the like. Moreover, the review may be objective or subjective, and can be in response to a specific set of circumstances or can be for no reason whatsoever other than periodic review. Thus, it may be that a relatively large amount of the internal data 12 of an organization can be subject to review by an auditor 16 performing a particular audit.

While the burden on the auditor 16 to review such internal data 12 increases as the amount of such internal data 12 increases, such burden is moderated by the fact that such internal data 12 is almost always now in an electronic form, and thus resides in a database 18 of the organization 10. Moreover, such burden is further moderated by the fact that such database 18 of the organization 10 is typically relatively sophisticated and is typically accessed by a relatively sophisticated user interface 20 that includes searching capabilities and that displays the internal data 12 in an easily reviewable format for member service purposes but not for audit purposes. Such database 18 and user interface 20 are generally known or should be apparent to the relevant public and therefore need not be set forth herein in any detail other than that which may be provided. Accordingly such database 18 and user interface 20 may be any appropriate database and user interface without departing from the spirit and scope of the present invention.

Notably, despite the fact that an organization 10 may be allowing an auditor 16 to review, audit, or otherwise access (hereinafter, 'audit') defined portion of internal data 12 of the organization 10 in a database 18 of the organization 10 by way of a user interface 20, such organization 10 should nevertheless restrict access by the auditor 16 to all other internal data 12 of the organization 10 not relevant to the scope of the audit. This is particularly true inasmuch as the database 18 and user interface 20 typically would allow the auditor 16 easy access to most any internal data 12 in the database 18 absent any restrictions imposed on such access. Nevertheless, restricting such access can be a daunting effort, especially when the potential exists that many auditors 16 are auditing such internal data 12.

It may be and oftentimes is the case that the user interface 20 employed by an auditor 16 to access the internal data 12 of an organization 10 is the same user interface 20 provided to an employee of the organization 10. Moreover, it may be and oftentimes is the case that such employee is provided by way of such user interface 20 almost unrestricted access to such internal data 12. While understandable with regard to such an employee who may have to locate most any type of information regarding a member 14 of the organization 10, for example, such unrestricted access is nevertheless unwarranted with regard to an external auditor 16 whose scope of inquiry ought to be limited to the defined internal data 12 relevant to the audit being performed. That is to say, an auditor 16 performing an audit should not be allowed access by way of the user interface 20 to internal data 12 not relevant to the audit. Moreover, such an auditor should not be allowed access by way of the user interface 20 systems of the organization 10 not relevant to the audit.

Auditing Data Definition Tool

In various embodiments of the present invention, then, an auditing data definition tool 22 is employed to define the internal data 12 required for a particular audit, among other things. The tool 22 produces an auditing data definition file 24 or the like for each audit, where the file 24 specifies the defined portion of internal data 12 for the audit, among other things, and the user interface 20 refers to the file 24 to decide whether to allow an auditor 16 access to particular internal data 12. Thus, the file 24 as produced by the tool 22 and as referred to by the user interface 20 restricts the auditor 16 to the internal data 12 deemed relevant to the audit, and access to other internal data 12 of the organization 10 is prohibited. In addition, the tool 22 and file 24 can specify systems of the organization 10 that the auditor 16 cannot access as being deemed not necessary to the audit being performed, and thus prevent the auditor 16 from employing such systems of the organization 10.

Figure 3:
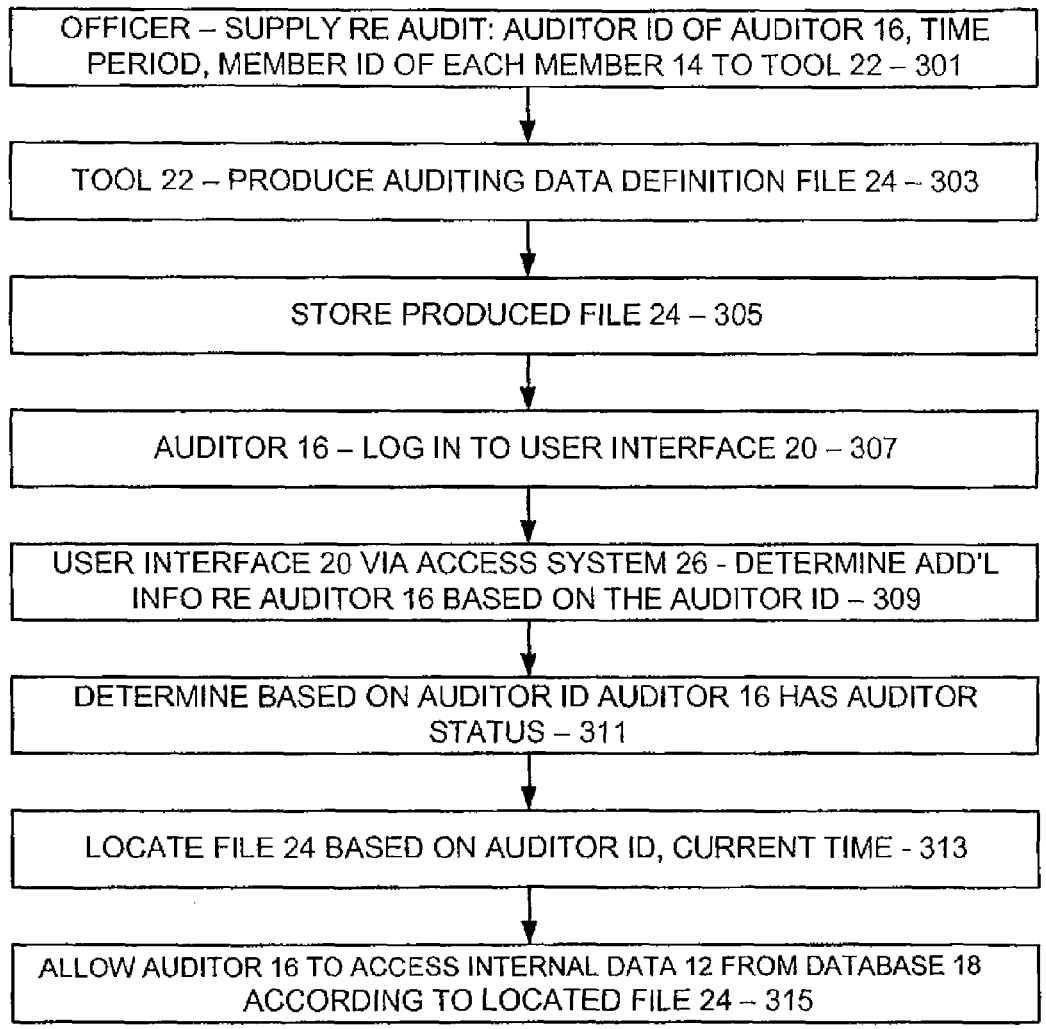
FIG. 3 is a flow diagram showing actions performed in connection with the auditor, user interface, and produced file of FIG. 2 in accordance with various embodiments of the present invention.

Referring now to FIG. 3, the method employed with the auditing data definition tool 22 to produce the file 24 is as follows. Preliminarily, it is to be assumed that a particular auditor 16 is to conduct a particular audit during a particular time period by accessing internal data of the organization 10 by way of a copy of the user interface 20 as instantiated on an appropriate computing device of the organization 10. Thus, the auditor 16 is expected to have an auditor identification (ID) established for logging into the user interface 20/computing device. In addition, the particular auditor 16 is expected to have already scheduled the particular audit for the particular time period. In doing so, the auditor 16 has already defined the scope of the audit and the quantity and type of internal data 12 to be accessed and reviewed. Typically, although not necessarily, an officer or other designated representative of the organization 10 collects such information from the auditor 16, either manually or by way of appropriate software.

Note that in defining the scope of the audit and the type of internal data 12 to be accessed and reviewed, the auditor 16 may define specific pieces of internal data 12 such as specific members 14 to be examined, or may define types of internal data 12 without identifying specific members 14 to be examined. In the latter case, it is typically the case that the office/representative/etc. of the organization 10 (hereinafter, 'officer') develops a data set of specific members 14 to be examined that correspond to the defined types of internal data 12. Developing such a data set of specific members 14 may be performed by the officer in any appropriate manner without departing from the spirit and scope of the present invention. For example, if the defined types of internal data 12 correspond to 5000 members 14 and the auditor has asked for a random sampling of 200 members 14 that correspond to such defined types of internal data 12, then the officer would select the 200 members 14 from among the 5000 members 14 on a random basis and would collect an identifier of each of the selected 200 members 14, such as for example a corresponding member 10 of each selected member 14.

At any rate, for the particular audit, the officer/representative/etc. supplies the auditor ID of the auditor 16, the time period for the audit, and the member ID of each member 14 that is subject to examination during the audit to the tool 22 (301). Doing so may be performed in any appropriate manner without departing from the spirit and scope of the present invention. For example, the tool 22 may present an input screen to collect the supplied information, and the officer may enter the information into appropriate displayed fields, either manually, by cutting and pasting, or by direct transfer from another location, as the case may be.

With the supplied information, the auditing data definition tool 22 produces the auditing data definition file 24 in an appropriate manner (303) so that the produced file 24 is recognizable and capable of being read by the user interface 20 or a related application, as the case may be. Thus, the format of the produced file 24 may be any appropriate format without departing from the spirit and scope of the present invention. For example, the format may be an XML (eXtensible Markup Language) format with appropriate tagging and other indicia. Thereafter, the produced file 24 is stored in a predetermined location where the file 24 is accessible to the user interface 20 or related application that will access and read same (305). Note here that the produced file 24 defines the internal data 12 needed for the particular audit according to the members 14 to be examined in connection therewith. However, the produced file 24 likely does not actually include the defined portion of internal data 12. Instead, such defined portion of internal data 12 is typically accessed by the auditor 16 from the database 18 by way of the user interface 20. Note too that it may be that the defined portion of internal data 12 as required for the audit by the auditor 16 may change during the course of such audit. If so, actions 301-305 may be repeated to produce and store a new file 24 or to retrieve and alter the stored file 24, and then re-store same.

Conducting the Audit

With the produced file 24 that specifies details of the audit including the auditor 16 that is to conduct the audit, the time period for the audit, and the members 14 whose internal data 12 is to be accessible to the auditor 16 for the audit, the auditor 16 in fact conducts the audit in the following manner. Preliminarily, the auditor 16 logs in to a user interface 20 in an appropriate manner (307), which typically involves supplying the auditor ID of such auditor 16, a password, and perhaps other security features. Notably, the user interface 20 refers to an access system 26 or the like of the organization 10 to determine additional information regarding the auditor 16 based on the auditor ID thereof (309). For example, the user interface 20 may determined from the access system 26 a name of the auditor 16 and basic access and security protocols that have been set for the auditor 16. Such an access system 26 may be separate from or included with the user interface 20, and is known or should be apparent to the relevant public and therefore need not be set forth herein in any detail. Accordingly, any appropriate access system 26 may be employed without departing from the spirit and scope of the present invention.

At any rate, in various embodiments of the present invention, the access system 26 determines based on the supplied auditor ID that the auditor 16 is in fact an auditor and is therefore to be provided restricted access to the database 18 based on such auditor status (311). In particular, the access system 26 locates the corresponding file 24 based on entered member information, the supplied auditor ID and the current time and then supplies same to the user interface 20, or else prompts the user interface 20 to itself locate the corresponding file 24 based on the entered member information, supplied auditor ID and the current time (313). Note here that if no file 24 can be located with the supplied auditor ID, it can only be presumed that the auditor 16 does not have any audit scheduled, and access is denied based thereon. Similarly, if no file 24 can be located with the supplied auditor ID that specifies a time period within which the current time resides, it can only be presumed that the auditor 16 is not conducting the audit within the time period set forth therefor, and access is also denied based thereon.

Presuming however, that a file 24 is located with the supplied auditor 10 that specifies a time period within which the current time resides, the process continues by allowing the auditor 16 to access the internal data 12 from the database 18 specified according to the located file 24 by the member IDs set forth therein (315). Note here that even though the auditor 16 has access to the internal data 12 according to the file 24, the access system 24 and/or the user interface 20 may restrict such access based on the auditor status of the auditor 16 and corresponding rules, as will be set forth in more detail below, and perhaps apart from restrictions incumbent in the file 24. As but one example, the access system 24 and/or the user interface 20 may only allow the auditor 16 to read the internal data 12, but not to alter same.

In various embodiments of the present invention, accessing the internal data 12 from the database 18 as at action 315 involves the auditor 16 entering a search string into the user interface 20 or filling out an on-screen search form associated with the user interface 20 to identify a particular member 14, Notably, and in various embodiments of the present invention, the user interface 20 presents each member 14 in the compiled list to the auditor only if the member ID of the member 14 is set forth in the located file 24.

Note that in addition to setting forth member IDs for members 14 whose internal data 12 can be accessed by the auditor 16, the file 24 as produced by the tool 22 may also set forth rules that specify how the auditor may interact with the accessed internal data 12. Alternatively, such rules may be set forth separately from the file 24 and applied by the user interface 20 based on the auditor status of the auditor 16 and/or the type of audit. In any event, such rules may be any appropriate rules without departing from the spirit and scope of the present invention. Examples of such rules are many and varied, but are generally in the nature of restrictions that prevent the auditor from being able to: create, update, or delete any internal data 12 of a member 14 other than what the system generates for administrative purposes; view product cost information relating to a member outside the scope of the audit 14; view detailed personal information about a member 14; view security information about a member 14; create, update or delete any product decision information relating to a member 14; view information of the member 14 in lines of business (auto, life, property, etc.) not related to the line of business being audited; view personal history information of a member 14; view any financial profile of a member 14; view referrals and life events of a member 14; take any actions when viewing activity information of a member 14; and the like. In a similar manner, the rules may prevent the auditor 16 from accessing system of the organization 10 not relevant to the audit, including systems that access internal and external network connections of the organization 10.

Such rules may be applied by the user interface 20 in connection with action 315 in most any appropriate manner without departing from the spirit and scope of the present invention, as long as the rules are in fact enforced as against the auditor 16. Application of such rules is generally known or should be apparent to the relevant public and therefore need not be set forth herein in any detail except that which is provided. Generally, application of a rule by the user interface 20 occurs by the user interface 20 disabling options available to the auditor 16, and/or by the user interface 20 omitting certain internal data 12 from being displayed to the auditor 16. For example, such disabling may be in the nature of disabling a cut or copy command, disabling an otherwise available menu selection, disabling a hyperlink that would otherwise be available, and the like.

Figure 4:
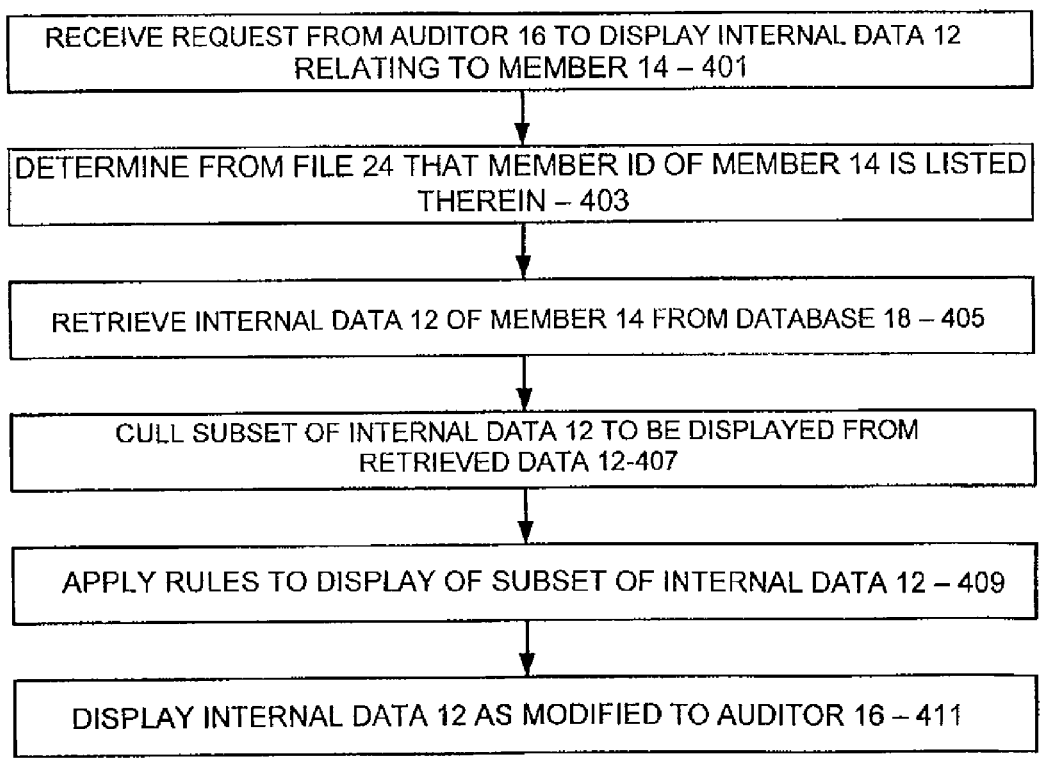
FIG. 4 is a flow diagram showing actions performed particularly by the user interface of FIG. 2 in accordance with various embodiments of the present invention.

Generally, then, and referring now to FIG. 4, upon receiving a request from the auditor 16 to display a particular subset of the internal data 12 relating to a member 14 (401), the user interface 20 determines from the file 24 that the member ID of such member 14 is listed therein (403), and if so the user interface 20 then retrieves the internal data 12 of the member 14 from the database 18 (405). Thereafter, the particular subset of the internal data 12 to be displayed is culled from the retrieved internal data 12 as necessary (407), the user interface 20 applies the rules from the file 24 or from elsewhere to the display of such particular subset of the internal data 12 (409) to result in any modifications that may be necessary in view of such rules, and the user interface 20 then displays such internal data 12 as modified to the auditor 16 (411).

CONCLUSION

The programming believed necessary to effectuate the processes performed in connection with the various embodiments of the present invention is relatively straight-forward and should be apparent to the relevant programming public. Accordingly, such programming is not attached hereto. Any particular programming, then, may be employed to effectuate the various embodiments of the present invention without departing from the spirit and scope thereof.

In the various embodiments of the present invention, systems and methods are provided for defining the internal data 12 of an organization 10 that may be accessed by an external auditor 16 auditing the organization 10, and for restricting access by such an external auditor 16 to such defined internal data 12 and no other internal data 12 of the organization 10. The external auditor 16 is identified, and the defined internal data 12 of the organization available to such identified external auditor is also identified. The identified auditor 16 is allowed to access such identified internal data 12, but is prevented from viewing or otherwise accessing any other internal data 12 of the organization 10, and also is prevented from accessing any systems of the organization 10 not deemed necessary to access the defined internal data 12 of the organization 10.

It should be appreciated that changes could be made to the various embodiments described above without departing from the inventive concepts thereof. Notably, although the various embodiments of the present invention may be set forth in terms of a particular industry such as insurance or banking or otherwise, such embodiments are not intended to be limited to any such particular industry. It should be understood, therefore, that this invention is not limited to the particular embodiments disclosed, but it is intended to cover modifications within the spirit and scope of the present invention as defined by the appended claims.

The invention claimed is:

1. A computer-implemented method with regard to internal data of an organization having members residing in an electronic database of the organization, the internal data is associated with multiple lines of insurance provided by the organization, the internal data is organized according to each member of the organization and is accessible from the electronic database by way of a user interface, the organization is subject to external review of the internal data thereof by an external entity, the computer-implemented method for restricting access by the external entity to only a defined portion of the internal data of the organization and a system of the organization related to an audit comprising:

specifying an identification (ID) of the external entity that is to perform the external review;

specifying a time period during which the external review will be conducted;

specifying the defined portion of the internal data in the electronic database that the external entity will access by way of the user interface, wherein the defined portion of the internal data is customer data associated with a particular line of insurance provided by the organization related to the audit;

supplying information including the specified external entity ID, the time period, and the defined portion of the internal data to a definition tool;

receiving from the definition tool a definition file produced thereby, the produced definition file having the supplied information set forth therein in a predetermined format for use by the user interface to ensure that the external entity as identified by the specified ID thereof performs the external review only during the specified time period, only accesses the system of the organization related to the audit, and only accesses the specified defined portion of the internal data in the database of the organization, wherein access for the external entity is denied when the external entity tries to access customer data associated with a line of insurance not related to the audit; and altering the definition file, during the time period in which the audit is being conducted, to restrict access to the specified defined portion of the internal data in response to a change in the specified defined portion of the internal data during the time period in which the audit is being conducted.

2. The computer-implemented method of claim 1 wherein the internal data for each member is selected from a group consisting of an identity of the member, financial information regarding the member, insurance information regarding the member, asset information regarding the member, a user name and password for the member, product information regarding the member, estimated claims and expenses derived from the member, an internal classification of the member, whether the member is in good standing, and whether the member is considered an especial risk.

3. The computer-implemented method of claim 1 wherein the external entity is an auditor and the external review is the audit performed by the auditor.

4. The computer-implemented method of claim 1 wherein specifying the defined portion of the internal data in the electronic database that the external entity will access comprises specifying a member ID of each of a plurality of members of the organization examined by the external entity during the external review.

5. The computer-implemented method of claim 1 wherein the predetermined format of the received definition file comprises an XML (eXtensible Markup Language) format with predetermined tagging.

6. The computer-implemented method of claim 1 wherein the predetermined format of the received definition file is recognizable and capable of being read by the user interface.

7. The computer-implemented method of claim 1 wherein the produced file is stored in a predetermined location where the file is accessible to the user interface.

8. A non-transitory computer-readable storage medium having stored thereon computer-executable instructions for performing a computer-implemented method with regard to internal data of an organization having members residing in an electronic database of the organization, the internal data is associated with multiple lines of insurance provided by the organization, the internal data is organized according to each member of the organization and is accessible from the electronic database by way of a user interface, the organization is subject to external review of the internal data thereof by an external entity, the computer-implemented method for restricting access by the external entity to only a defined portion of the internal data of the organization and a system of the organization related to an audit comprising:
- specifying an identification (ID) of the external entity that is to perform the external review;
- specifying a time period during which the external review will be conducted;
- specifying the defined portion of the internal data in the electronic database that the external entity will access by way of the user interface, wherein the defined portion of the internal data is customer data associated with a particular line of insurance provided by the organization related to the audit;
- supplying information including the specified external entity ID, the time period, and the defined portion of the internal data to a definition tool;
- receiving from the definition tool a definition file produced thereby, the produced definition file having the supplied information set forth therein in a predetermined format for use by the user interface to ensure that the external entity as identified by the specified ID thereof performs the external review only during the specified time period, only accesses the system of the organization related to the audit, and only accesses the specified defined portion of the internal data in the database of the organization, wherein access for the external entity is denied when the external entity tries to access customer data associated with a line of insurance not related to the audit; and
- altering the definition file, during the time period in which the audit is being conducted, to restrict access to the specified defined portion of the internal data in response to a change in the specified defined portion of the internal data during the time period in which the audit is being conducted.

9. The medium of claim 8 wherein the internal data for each member is selected from a group consisting of an identity of the member, financial information regarding the member, insurance information regarding the member, asset information regarding the member, a user name and password for the member, product information regarding the member, estimated claims and expenses derived from the member, an internal classification of the member, whether the member is in good standing, and whether the member is considered an especial risk.

10. The medium of claim 8 wherein the external entity is an auditor and the external review is the audit performed by the auditor.

11. The medium of claim 8 wherein specifying the defined portion of the internal data in the electronic database that the external entity is to be able to access comprises specifying a member ID of each of a plurality of members of the organization examined by the external entity during the external review.

12. The medium of claim 8 wherein the predetermined format of the received definition file comprises an XML (eXtensible Markup Language) format with predetermined tagging.

13. The medium of claim 8 wherein the predetermined format of the received definition file is recognizable and capable of being read by the user interface.

14. The medium of claim 8 wherein the produced file is stored in a predetermined location where the file is accessible to the user interface.

15. A system with regard to internal data of an organization having members residing in an electronic database of the organization, the internal data is associated with multiple lines of insurance provided by the organization, the internal data is organized according to each member of the organization and is accessible from the electronic database by way of a user interface, the organization is subject to external review of the internal data thereof by an external entity, the system for restricting access by the external entity to only a defined portion of the internal data of the organization and a system of the organization related to an audit, the system with regard to internal data of an organization having members using a non-transitory computer-readable medium encoded with computer-readable instructions, the computer-readable instructions comprising instructions stored thereon that are executed by a processor, wherein the system with regard to internal data of an organization having members comprises:
- a sub-system for specifying an identification (ID) of the external entity that is to perform the external review;
- a sub-system for specifying a time period during which the external review will be conducted;
- a sub-system for specifying the defined portion of the internal data in the electronic database that the external entity will access by way of the user interface, wherein the defined portion of the internal data is customer data associated with a particular line of insurance provided by the organization related to the audit;
- a sub-system for supplying information including the specified external entity ID, the time period, and the defined portion of the internal data to a definition tool;
- a sub-system for receiving, with a computer, from the definition tool a definition file produced thereby, the produced definition file having the supplied information set forth therein in a predetermined format for use by the user interface to ensure that the external entity as identified by the specified ID thereof performs the external review only during the specified time period, only accesses the system of the organization related to the audit, and only accesses the specified defined portion of the internal data in the database of the organization, wherein access for the external entity is denied when the external entity tries to access customer data associated with a line of insurance not related to the audit; and
- a sub-system for altering the definition file, during the time period in which the audit is being conducted, to restrict access to the specified defined portion of the internal data in response to a change in the specified defined portion of the internal data during the time period in which the audit is being conducted.

16. The system with regard to internal data of an organization having members of claim 15 wherein the internal data for each member is selected from a group consisting of an identity of the member, financial information regarding the member, insurance information regarding the member, asset information regarding the member, a user name and password for the member, product information regarding the member, estimated claims and expenses derived from the member, an internal classification of the member, whether the member is in good standing, and whether the member is considered an especial risk.

17. The system with regard to internal data of an organization having members of claim 15 wherein the external entity is an auditor and the external review is the audit performed by the auditor.

18. The system with regard to internal data of an organization having members of claim 15 wherein the sub-system for specifying the defined portion of the internal data in the electronic database that the external entity will access comprises a sub-system for specifying a member ID of each of a plurality of members of the organization examined by the external entity during the external review.

19. The system with regard to internal data of an organization having members of claim 15 wherein the predetermined format of the received definition file comprises an XML (eXtensible Markup Language) format with predetermined tagging.

20. The system with regard to internal data of an organization having members of claim 15 wherein the predetermined format of the received definition file is recognizable and capable of being read by the user interface.

21. The system with regard to internal data of an organization having members of claim 15 wherein the produced file is stored in a predetermined location where the file is accessible to the user interface.

* * * * *